Sept. 20, 1927.
O. H. PETERSON
1,642,939
RECORD HOLDING HANDLE FOR MILK CANS
Filed March 24, 1926
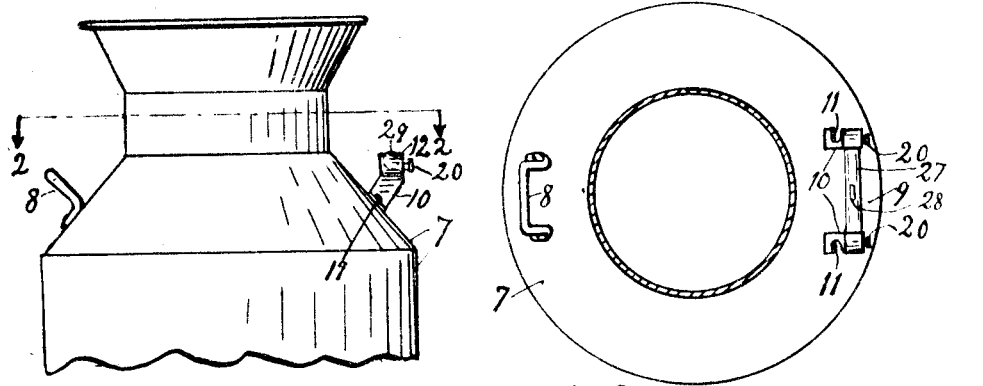
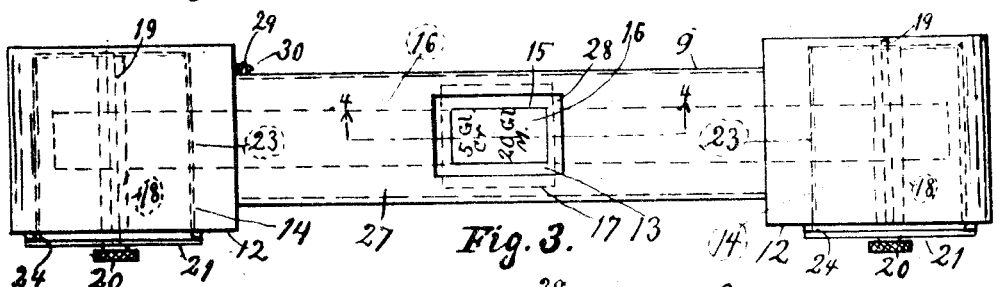
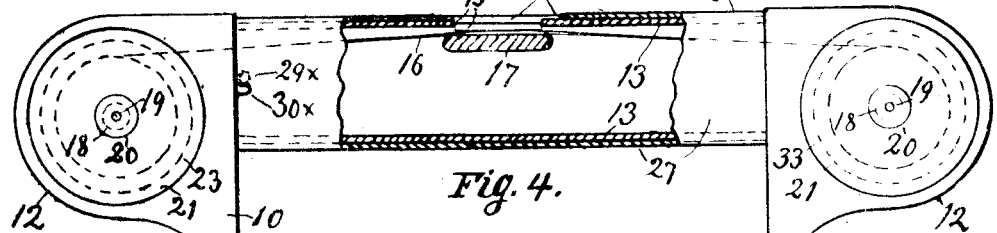
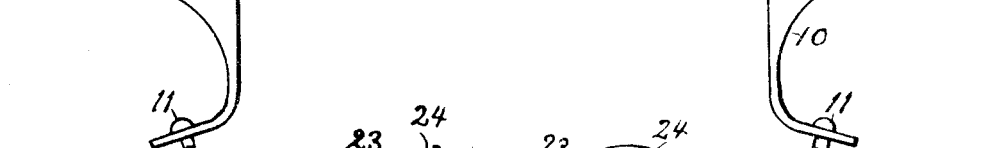
INVENTOR:
Otto H. Peterson
BY David E. Carlsen
Attorney Patented Sept. 20, 1927.

1,642,939

UNITED STATES PATENT OFFICE.

OTTO H. PETERSON, OF NORTHFIELD, MINNESOTA.

RECORD-HOLDING HANDLE FOR MILK CANS.

Application filed March 24, 1926. Serial No. 96,962.

My invention relates to handles for cans, particularly for milk and cream cans and other containers having one or more lifting handles. The object of the invention is to provide such handle with means upon which may readily be recorded the quantity and quality of milk, cream or other commodity delivered from one or more cans in a certain shipment or delivery, as for instance when a farmer or other producer delivers cream and milk to a creamery a number of times and then afterward sums up for record and makes out a bill for the entire period.

In the accompanying drawing:

Fig. 1 is a side elevation of the upper portion of a milk can equipped with my invention.

Fig. 2 is a section on the line 2—2 in Fig. 1.

Fig. 3 is an enlarged top view of the record-holding handle shown to the right in Figs. 1 and 2.

Fig. 4 is a side view of Fig. 3 showing also its section on the line 4—4.

Fig. 5 is a detail side view of one of the record-holding and winding drums or cylinders of the device with its winding stem in diametrical section.

Fig. 6 is a left hand end view of Fig. 5.

Referring to the drawing by reference numerals, 7 designates the upper portion of a milk can, which as a rule is provided with two handles similar to that marked 8 in the drawing. When a can is to be equipped with my device one of said handles is omitted, or removed if present, and is substituted by my record-holding handle 9 which is formed with two brackets 10 adapted to be secured to the can by rivets 11 or other suitable means. Each of said brackets has a head 12 firmly united with the other head by a tube 13 opening into cylindrical cavities 14 in the heads and having near its middle an aperture 15, through which the operator may write any desired record upon a record slip or ribbon 16 which is slidable upon a support 17 fixed in the tube. Said ribbon may be of paper or other suitable flexible material and has its two ends attached to winding spools 18 each of which has a shaft 19 with a winding stem 20 to rotate it by. Each shaft 19 is journaled in the bottom 21 and a cross bar 22 of a cylinder 23 which is inserted in the head 10 and held therein by screwthreads 24, or other suitable means.

Each cylinder 23 has a side opening 25 (see Fig. 5) through which the end of the record ribbon 16 is inserted and engaged by a hook 26 of the winding spool 18. The entire tube 13 is covered by a rotatable sleeve 27 having in one side an aperture 28 through which the aperture 15 in the handle is exposed when the sleeve is turned with its finger 29 against a stop 30 on one of the brackets 12, and when the sleeve is given half a turn so that the finger 29ˣ touches a second stop 30ˣ (see Fig. 4) the aperture 28 will be diametrically opposite from the aperture 15 and turned downward so that in case of rain no water can enter either of said apertures.

In the use of the device, various systems which need not here be described, may be followed; but in Fig. 3 is given some idea by showing for instance how a farmer may have recorded the delivery of five gallons of cream and twenty gallons of milk, in abbreviated form, and of course if so desired he may also mark down the grade or quality of the goods and the date of delivery. When the next delivery is to be recorded he simply turns one of the stems 20 so as to get a clear portion of the ribbon into view for writing on it in the aperture 15, and after writing on it he covers it up by the solid side of the rotatable sleeve. In this manner the record is always to be found in the handle of any one or more cans of every shipment.

If so desired the recording slip may be double and carbon paper placed between them, so as to enable the user to tear off a portion of one of the slips for retention by one of the parties to the deal at each delivery; but as this method is not new I need not here describe it any further.

What I claim is:

A handle for containers comprising a tubular hand hold and end supports therefor for holding the said hand hold in fixed spaced relation to the container, said hand hold having a lateral sight aperture, a magazine at each end of the hand hold adapted to retain a record reel with a record strip arranged to be wound on one reel from the other past said sight aperture and means for closing said sight aperture.

In testimony whereof I affix my signature.

OTTO H. PETERSON.